(12) United States Patent
Keech et al.

(10) Patent No.: US 9,859,952 B2
(45) Date of Patent: Jan. 2, 2018

(54) METHODS AND APPARATUS RELATING TO MEASUREMENT INSTRUMENTS

(71) Applicant: ABB Limited, Stonehouse, Gloucestershire (GB)

(72) Inventors: Ray Keech, Stonehouse (GB); Neil Coleman, Stonehouse (GB); Peter Asquith, Stonehouse (GB); Simon Draper, Stonehouse (GB)

(73) Assignee: ABB Limited, Stonehouse, Gloucestershire (GB)

( * ) Notice: Subject to any disclaimer, the term of this patent is extended or adjusted under 35 U.S.C. 154(b) by 124 days.

(21) Appl. No.: 14/512,117

(22) Filed: Oct. 10, 2014

(65) Prior Publication Data

US 2015/0102940 A1 Apr. 16, 2015

(30) Foreign Application Priority Data

Oct. 10, 2013 (GB) .................................. 1317953.6

(51) Int. Cl.
*H04B 5/00* (2006.01)
*G05B 19/042* (2006.01)
*H04Q 9/00* (2006.01)

(52) U.S. Cl.
CPC ....... *H04B 5/0031* (2013.01); *G05B 19/0423* (2013.01); *H04Q 9/00* (2013.01); *G08C 2201/93* (2013.01); *H04Q 2209/40* (2013.01)

(58) Field of Classification Search
CPC ........ G05B 19/0423; A61B 2560/0242; A61B 2560/0462; G08C 2201/93; G06K 19/0717; G06K 19/0723; G01D 4/006; G06Q 50/06

USPC .................................................... 340/870.02
See application file for complete search history.

(56) References Cited

U.S. PATENT DOCUMENTS

| 7,178,416 | B2 * | 2/2007 | Whelan ................ B01L 3/545 73/61.48 |
| 8,514,825 | B1 | 8/2013 | Addepalli et al. |
| 2005/0088299 | A1 * | 4/2005 | Bandy ................ G08B 25/10 340/539.16 |
| 2006/0022841 | A1 * | 2/2006 | Hoiness ............... G01D 4/006 340/870.02 |
| 2008/0272933 | A1 | 11/2008 | Cahill-O'Brien et al. |
| 2009/0204250 | A1 * | 8/2009 | Potyrailo ............. G01D 9/005 700/109 |
| 2011/0217205 | A1 * | 9/2011 | Peeters ............... A61B 5/0002 422/69 |
| 2012/0042213 | A1 | 2/2012 | Zimmerman |

(Continued)

FOREIGN PATENT DOCUMENTS

| CH | 705533 | 3/2013 |
| CN | 102914414 | 2/2013 |

OTHER PUBLICATIONS

United Kingdom Search Report for GB Application No. 1317953.6 dated Feb. 3, 2014 (5 pages).

(Continued)

*Primary Examiner* — Mirza Alam
(74) *Attorney, Agent, or Firm* — Merchant & Gould P.C.

(57) ABSTRACT

Methods and apparatus are for storing and retrieving data related to the installation, service, repair or performance of an industrial flow meter or other measurement instrument. Methods and apparatus are also for other processes associated with measurement instruments.

24 Claims, 1 Drawing Sheet

(56) References Cited

U.S. PATENT DOCUMENTS

| | | |
|---|---|---|
| 2012/0278134 A1 | 11/2012 | Papay et al. |
| 2012/0316843 A1 | 12/2012 | Beno et al. |
| 2013/0060395 A1* | 3/2013 | Burke ................. G06Q 10/087 |
| | | 700/295 |
| 2013/0191513 A1 | 7/2013 | Kamen et al. |
| 2013/0226371 A1 | 8/2013 | Rovik et al. |

OTHER PUBLICATIONS

United Kingdom Search Report for GB Application No. 1317953.6 dated Apr. 1, 2014 (2 pages).

* cited by examiner

METHODS AND APPARATUS RELATING TO MEASUREMENT INSTRUMENTS

This application claims benefit of Serial No. 1317953.6, filed 10 Oct. 2013 in the United Kingdom and which application is incorporated herein by reference. To the extent appropriate, a claim of priority is made to the above disclosed application.

BACKGROUND

The present invention relates to electronic measurement instruments and the storage and retrieval of data relating to such instruments. It is particularly applicable, but by no means limited, to electronic metering devices, such as flow meters.

Examples of electronic measurement instruments include flow meters, pH meters, pressure sensors, level sensors, temperature sensors, utility consumption meters, drive/actuator monitoring instruments, and robotic instruments. Such instruments measure and record, in digital form, measurables for subsequent reference or analysis.

For example, flow meters may be configured to measure the quantity, rate or pressure of fluid flowing along a pipe, or into or out of a vessel. pH meters may be arranged to measure the acidity or alkalinity of a fluid or other substance. Pressure and temperature sensors may be used to measure respectively the pressure or temperature of a fluid or other substance, for example flowing along a pipe or in a vessel. Level sensors measure the level or depth of a substance in a vessel.

Utility consumption meters measure the consumption over time of a utility such as gas, electricity or water. Some such meters (e.g. as may be referred to as "smart meters") may be configured to transmit their readings automatically, via a wired or wireless link, to a data storage device. Others require a person to visit them to take a reading. The present work is applicable to both these types of meters.

Drive/actuator monitoring instruments may be arranged to measure operational or performance characteristics of equipment such as motors, actuators or valves. Such characteristics may include running speed, vibration levels, noise levels, temperature, and so on.

When installing or servicing such measurement instruments, or visiting them to take a reading or to otherwise inspect them, an engineer may wish to store or retrieve information for a variety of purposes relating to the measurement instrument and its operation. The engineer's supervisor, or a customer, may also wish to have access to such information.

For example, when installing the measurement instrument, the engineer may require information to assist him, if he is unsure of a particular aspect of the installation procedure.

As another example, during a service visit the engineer may suspect that the instrument has been tampered with, or was not installed correctly, but does not know, or cannot prove, how it should correctly look.

Alternatively, during a service visit, the engineer may wish to call upon past operational data relating to the instrument, for example to compare such data with current data.

In all such instances, retrieving the desired information can be awkward, time consuming and inefficient.

Further issues are particularly associated with measurement instruments in an industrial setting, and industrial flow meters in particular, to which the present work is particularly applicable.

In this respect, it will be appreciated that a large number of industrial flow meters (e.g. of the order of several tens, or a hundred or more) can often be located in a single site, such as a petrochemical plant. The meters themselves can also often be located in awkward locations, making access and inspection difficult. As a consequence, during an inspection exercise, it can sometimes be difficult for an engineer to identify each meter, understand its purpose, verify whether it was installed correctly, determine whether it has since been tampered with, check its operational behaviour, perform a service or repair, and so on.

There is therefore a desire to improve the ease and efficiency with which data relating to flow meters and other measurement instruments can be stored and retrieved.

Other problems associated with existing flow meters and other measurement instruments will also become apparent from the discussion below.

SUMMARY

According to a first aspect of the invention there is provided a method of storing data related to the installation, service or performance of a measurement instrument, the method being performed by a mobile device and comprising: interrogating the measurement instrument using near field communication; receiving, in response to the interrogation, reference data from the measurement instrument; capturing data related to the installation, service or performance of the measurement instrument; and storing the captured data using or in association with the reference data in a data storage device.

The term "near field communication" or "NFC" as used herein should be interpreted broadly, to encompass radio frequency identification (RFID) technology and other forms of data communication via inductive coupling.

NFC interrogation of the measurement instrument provides a straightforward and efficient way of obtaining the reference data from the measurement instrument, that can readily be performed by an installation or service engineer in an operational environment. It is particularly well suited to industrial environments in which a given measurement instrument is among several (or many) others, or in situations where accessing or identifying a given measurement instrument may be difficult. Moreover, having obtained the reference data from the measurement instrument via NFC interrogation, the captured data can then be readily and efficiently stored in a data storage device, using or in association with the reference data. Subsequently the captured data can be readily retrieved by appropriate personnel, using or through association with the reference data.

Capturing the data may comprise capturing data created by a user (e.g. an installation or service engineer). For example, capturing the data may comprise taking a photograph or a video clip during an installation or service process, or recording audio. Such data may be beneficial to engineers during subsequent service or repair operations, or for determining whether the measurement instrument has been tampered with, or whether it was installed correctly, for example.

Alternatively, or in addition, capturing the data may comprise capturing data relating to the physical position of the measurement instrument or of a port of the measurement instrument. This may be of assistance to engineers in locating the measurement instrument or its port in the future, or for inventory management purposes and such like.

For example, capturing the data may comprise capturing the geolocation of the measurement instrument or its port using location determining means of the mobile device. Further for example, capturing the data may comprise capturing the compass bearing of the measurement instrument or its port, or the inclination of the measurement instrument or its port, using one or more sensors of the mobile device.

Alternatively, or in addition, capturing the data may comprise capturing data relating to operational characteristics of the measurement instrument via one or more sensors of the mobile device. Such data may be useful for in-situ verification or evaluation of the performance of the measurement instrument, or to investigate or log aspects of its operation, for example. The operational characteristics may comprise, for example, vibration levels detected via said sensor(s) of the mobile device, or may comprise noise levels detected by an audio input of the mobile device.

Alternatively, or in addition, capturing the data may comprise receiving, in response to the interrogation, data from the measurement instrument in addition to the reference data. For example, the data received from the measurement instrument may include data relating to operational characteristics of the measurement instrument as detected by one or more sensors associated with the measurement instrument. Such sensors associated with the measurement instrument may include one or more of: a vibration sensor, a tamper detector, a movement detector, an accelerometer, an inclinometer, a magnetometer, or a positioning receiver. Such data may be useful for in-situ verification or evaluation of the performance of the measurement instrument, or to investigate or log aspects of its operation, for example. Alternatively, or in addition, the data received from the measurement instrument may include a current or past instrument reading (e.g. for the measurement purpose for which the instrument is primarily employed).

Alternatively, or in addition, capturing the data may comprise receiving text or diagrams inputted or selected using the mobile device, which may be of assistance to engineers during future service or repair operations, for example.

The reference data may comprise one or more of an instrument identifier, a hyperlink, a position code or location information.

Storing the captured data using or in association with the reference data may comprise storing the data in storage means incorporated in the mobile device.

Alternatively, or in addition, storing the captured data using or in association with the reference data may comprise storing the data in a storage device separate from the mobile device and in communication with the mobile device via a network.

Alternatively, storing the captured data using or in association with the reference data may comprise storing the data in storage means incorporated in the measurement instrument.

The method may further comprise the mobile device analysing the data collected from the measurement instrument, to determine whether recalibration or reconfiguration of the measurement instrument is necessary; and in dependence on recalibration or reconfiguration being determined as necessary, producing recalibration or reconfiguration data and sending it to the measurement instrument via near field communication, to recalibrate or reconfigure the measurement instrument.

Alternatively, the method may further comprise the mobile device sending the data collected from the measurement instrument to another location for analysis, to determine whether recalibration or reconfiguration of the measurement instrument is necessary; and in dependence on recalibration or reconfiguration being determined as necessary, receiving recalibration or reconfiguration data from the other location and then sending it to the measurement instrument via near field communication, to recalibrate or reconfigure the measurement instrument.

Alternatively, to perform in-situ verification of the performance of the measurement instrument, the method may comprise the mobile device analysing the data collected from the measurement instrument, or the mobile device sending the data collected from the measurement instrument to another location for analysis.

In certain embodiments the measurement instrument is a flow meter. Alternatively, however, the measurement instrument may be a pH meter, pressure sensor, level sensor, temperature sensor, utility consumption meter, drive/actuator monitoring instrument, or robotic instrument, for example, or another type of measurement instrument as those skilled in the art will appreciate.

According to a second aspect of the invention there is provided a mobile device programmed and configured to execute a method in accordance with the first aspect of the invention. The mobile device may be, for example, a smart phone, tablet, portable computer, personal digital assistant, or such like.

According to a third aspect of the invention there is provided a measurement instrument comprising: means for capturing data relating to the operation or functionality of the measurement instrument, in addition to data relating to one or more instrument or diagnostic readings; means for receiving an interrogation signal via near field communication; and means for transmitting via near field communication, in response to the interrogation signal, reference data in respect of the measurement instrument together with the captured data, The means for capturing data relating to the operation of the measurement instrument may comprise one or more of: a vibration sensor, a tamper detector, a movement detector, an accelerometer, an inclinometer, a magnetometer, or a positioning receiver.

The measurement instrument may further comprise means to receive and process recalibration, reconfiguration or reprogramming data received via near field communication. In certain embodiments the reconfiguration data may comprise an activation instruction code to activate hitherto dormant functionality within the measurement instrument.

The captured data may be such as to enable in-situ verification of the performance of the measurement instrument to be carried out.

The reference data may comprise one or more of an instrument identifier, a hyperlink, a position code or location information.

In certain embodiments the measurement instrument is a flow meter. Alternatively, however, the measurement instrument may be a pH meter, pressure sensor, level sensor, temperature sensor, utility consumption meter, drive/actuator monitoring instrument, or robotic instrument, for example, or another type of measurement instrument as those skilled in the art will appreciate.

According to a fourth aspect of the invention there is provided a method of retrieving data related to the installation, service or performance of a measurement instrument, the method being performed by a mobile device and comprising: interrogating the measurement instrument using near field communication; receiving, in response to the interrogation, reference data from the measurement instrument; and retrieving data related to the installation, service or performance of the measurement instrument from a data storage device, using or through association with the reference data.

The retrieved data may comprise data created by a user, such as a photograph or a video clip or recorded audio, for example.

Alternatively, or in addition, the retrieved data may comprise captured data relating to the physical position of the measurement instrument or a port of the measurement instrument. The captured data may comprise the geolocation of the measurement instrument or its port, the compass bearing of the measurement instrument or its port, or the inclination of the measurement instrument or its port.

Alternatively, or in addition, the retrieved data may comprise captured data relating to operational characteristics of the measurement instrument. The operational characteristics may comprise, for example, vibration levels and/or noise levels.

Alternatively, or in addition, the retrieved data may comprise text, images, audio or video clips.

The reference data may comprise one or more of an instrument identifier, a hyperlink, a position code or location information.

The data storage device may be incorporated within the mobile device, or may be separate from the mobile device and in communication with the mobile device via a network, or may be incorporated in the measurement instrument.

The method may further comprise outputting the data to a user.

In certain embodiments the measurement instrument is a flow meter. Alternatively, however, the measurement instrument may be a pH meter, pressure sensor, level sensor, temperature sensor, utility consumption meter, drive/actuator monitoring instrument, or robotic instrument, for example, or another type of measurement instrument as those skilled in the art will appreciate.

According to a fifth aspect of the invention there is provided a mobile device programmed and configured to execute a method in accordance with the fourth aspect of the invention.

The mobile device may be, for example, a smart phone, tablet, portable computer, personal digital assistant, or such like.

According to a sixth aspect of the invention there is provided a mobile device having one or more sensors for measuring vibration levels to which the device is subjected, and programmed and configured to: interrogate a measurement instrument using near field communication; receive, in response to the interrogation, reference data from the measurement instrument; retrieve one or more predetermined threshold(s) from a data storage device, based on the reference data, the predetermined threshold(s) defining suitable conditions for the installation of the measurement instrument; measure a vibration level in the location of the device; compare the measured vibration level with the one or more predetermined threshold(s); and based on the outcome of the comparison, indicate whether or not the location is suitable for the installation of the measurement instrument.

Thus, advantageously, such a device can effectively act as a site survey tool, to assess the suitability (in terms of vibration levels) of a location for the installation of a measurement instrument, either prior to or after the installation of the instrument.

The device may be programmed and configured to indicate that the location is unsuitable in dependence on an upper threshold being exceeded.

The device may be further programmed and configured to indicate that the location is unsuitable in dependence on a lower threshold not being met, the lower threshold representing the minimum level suitable for energy scavenging by the measurement instrument.

According to a seventh aspect of the invention there is provided a method of assessing the suitability of a site for the installation of a measurement instrument, the method being performed by a mobile device and comprising: interrogating a measurement instrument using near field communication; receiving, in response to the interrogation, reference data from the measurement instrument; retrieving one or more predetermined threshold(s) from a data storage device, based on the reference data, the predetermined threshold(s) defining suitable conditions for the installation of the measurement instrument; using one or more sensors to measure a vibration level in the location of the device; comparing the measured vibration level with the one or more predetermined threshold(s); and based on the outcome of the comparison, indicating whether or not the location is suitable for the installation of the measurement instrument.

The method may further comprise indicating that the location is unsuitable in dependence on an upper threshold being exceeded.

The method may further comprise indicating that the location is unsuitable in dependence on a lower threshold not being met, the lower threshold representing the minimum level suitable for energy scavenging by the measurement instrument.

According to a further aspect of the invention there is provided a computer program or set of instruction code comprising instructions which, when executed, cause a processing device to implement the method of any of the first, fourth or seventh aspects of the invention, or to become configured as the mobile device of any of the second, fifth or sixth aspects of the invention, or to become configured as the measurement instrument of the third aspect of the invention.

According to a yet further aspect of the invention there is provided a method of installing, servicing, diagnosing or repairing a measurement instrument, the method comprising using a mobile device to perform a method in accordance with any of the first, fourth or seventh aspects of the invention.

BRIEF DESCRIPTION OF THE DRAWING

Embodiments of the invention will now be described, by way of example only, and with reference to the drawings in which.

DETAILED DESCRIPTION

Figure 1:
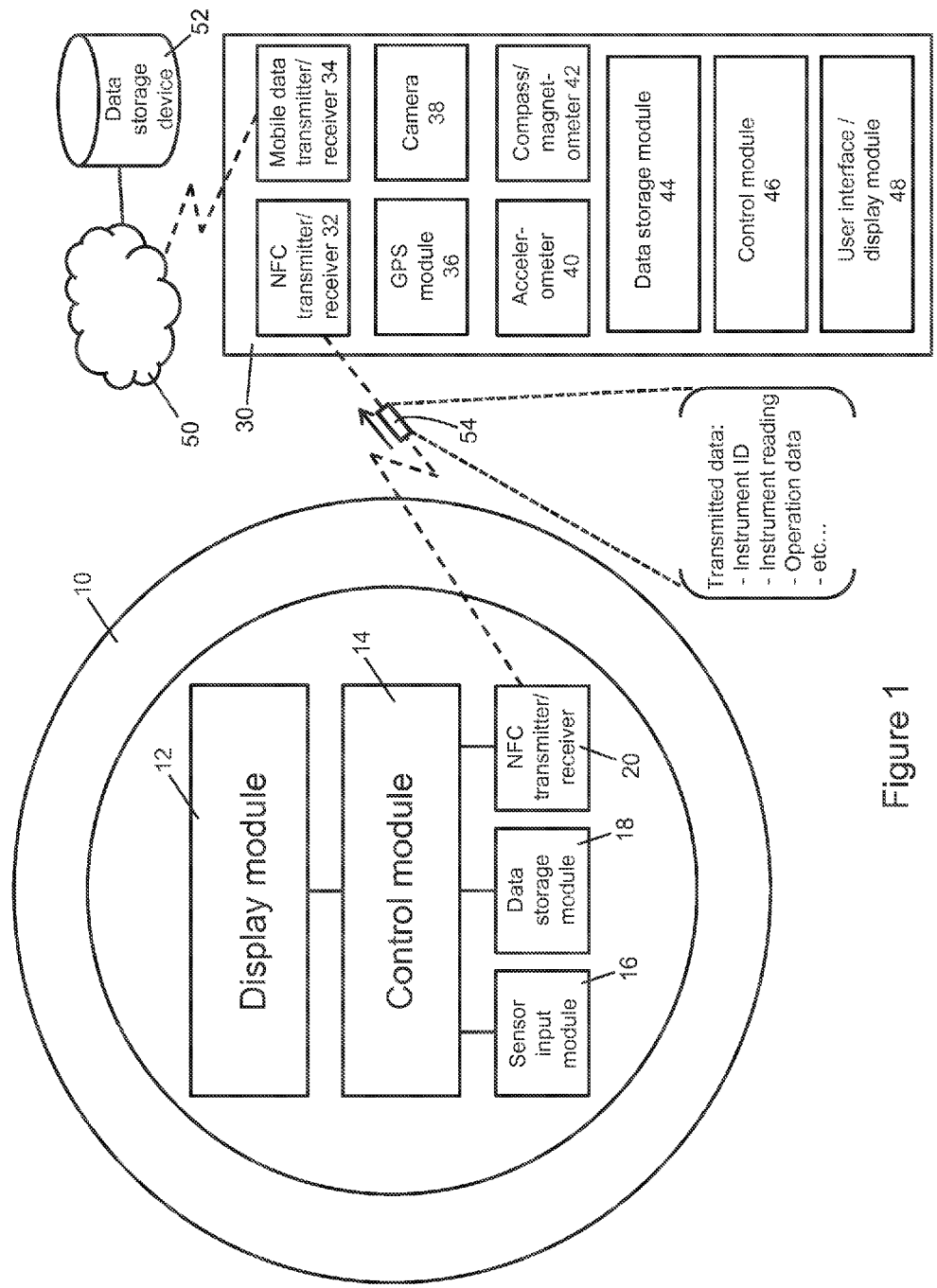
FIG. 1 illustrates schematically a flow meter in near field communication with a mobile device (such as a smart phone, tablet computer or portable computer).

The present embodiments represent the best ways known to the applicants of putting the invention into practice. However, they are not the only ways in which this can be achieved.

Industrial Flow Meter

FIG. 1 illustrates an embodiment of an industrial flow meter 10, this being a type of electronic measurement instrument to which the present invention is particularly applicable.

In the embodiment illustrated, the flow meter 10 comprises a display module 12, a control module 14, a sensor input module 16, a data storage module 18 and a near field communication (NFC) transmitter/receiver module 20.

The display module 12 includes a display panel, or other display means, by which the current measurement of the flow meter 10 can be presented to a viewer, for example to enable a reading to be taken. Such a display module 12 is optional, however, since the data may be transmitted away from the meter for reference or analysis, rather than needing to be read in-situ by a person.

The sensor input module 16 is configured to receive measurement signals from one or more sensors associated with the flow meter 10, and to provide those signals in digital form to the control module 14. The sensor(s) may either be incorporated in the flow meter itself, or coupled to it via a wired or wireless connection.

The sensors, which provide measurement signals to the input module 16, are considered herein to fall into two main types—principal sensors and ancillary sensors. One or more principal sensor(s) may be used to collect data in respect of the matter for which the flow meter is primarily employed—i.e. measuring fluid flow along a pipe. Additionally, one or more ancillary sensor(s) may also be provided, to collect data regarding the operation or situation of the flow meter itself (such data being referred to herein as "operation data"). Examples of ancillary sensors may include a vibration sensor, a tamper detector, a movement detector, an accelerometer or inclinometer, a magnetometer, or a positioning receiver (e.g. a GPS receiver).

The control module 14 is programmed in firmware to control the overall operation of the flow meter 10. More particularly, the control module 14 is configured to receive the digitised measurement signals from the sensor input module 16, to convert those signals into one or more measurement values if such conversion is necessary (for example if the sensors simply provide raw data, such as uncalibrated voltage levels, rather than calibrated measurement values), and to send the measurement values to the data storage module 18. If the flow meter 10 is provided with a display module 12, then the control module 14 may also send measurement values, particularly from the principal sensor(s), to the display module 12 for display.

The data storage module 18 incorporates data storage means such as a flash memory, so that the data is preserved in the event of power failure. The measurements received via the sensor input module 16 may be stored together with the times and dates at which they were made.

The NFC transmitter/receiver module 20 is provided in order to enable the flow meter 10 to communicate data with an NFC-enabled mobile device 30, such as a smart phone, tablet, portable computer, personal digital assistant, or other mobile station. In particular, the NFC transmitter/receiver module 20 is operable, when interrogated by an NFC-enabled mobile device 30, to transmit to the mobile device 30 a data packet 54 containing at least an item of reference data associated with the flow meter 10. In a presently-preferred embodiment the item of reference data is an instrument identifier of the flow meter 10. In other embodiments, however, the item of reference data may comprise one or more of a hyperlink, a position code or location information, for example.

As those skilled in the art will appreciate, NFC-enabled devices are operable, under agreed standards (such as ISO/IEC 18092/ECMA-340, or ISO/IEC 21481/ECMA-352), to establish short-range radio communication with each other through inductive coupling, by touching the devices together or bringing them into close proximity with each other. Typically, to communicate with one another, NFC-enabled devices need to be brought to within a distance of 10 cm of one another, or less. The setup time for the NFC-enabled devices to enter into communication with one another is short, typically less than 0.1 s.

In accordance with NFC terminology, the mobile device 30 may be considered to be the interrogating device, and the flow meter 10 may be considered to be the device being interrogated.

According to embodiments of the invention, NFC-enabled flow meters may be either "passive" or "active". With a passive flow meter 10, the NFC transmitter/receiver module 20 does not draw power from its own power supply, but instead the interrogating device 30 provides an RF (radio frequency) field carrier frequency, and the flow meter 10 replies using this field power. If the flow meter 10 is operating in a passive sense, then the distance of proximity necessary for communication to take place between the devices may be in the range of 10 mm to 40 mm or less.

Alternatively, the flow meter 10 may be "active", in which case either device (flow meter 10 or mobile device 30) can generate the RF field and initiate communication between the two devices.

NFC-enabled devices typically use little power, and thus NFC is well-suited for use with measurement instruments that are powered by batteries or renewable energy sources. NFC transmitters are also relatively inexpensive, with current ones (such as Texas Instruments' RF430CL330H) costing of the order of US $1.

Under current specifications, NFC operates at a frequency of 13.56 MHz on the ISO/IEC 18000-3 air interface, and at rates in the range of 106 kbit/s to 424 kbit/s (typically using two loop antennas). Nevertheless, the present work is intended to be applicable to future developments of NFC technology, which may operate at different frequencies or data transfer rates.

As those skilled in the art will also appreciate, NFC is a development of RFID (radio frequency identification) technology, and in alternative embodiments the NFC transmitter/receiver module 20 may be replaced with a more basic RFID module, configured to transmit, on interrogation, an identification code only.

NFC and RFID are both examples of data communication via inductive coupling. Other forms of data communication via inductive coupling are also possible, and may be used in place of the described NFC or RFID technology.

Mobile Device

FIG. 1 includes a schematic illustration of an example of a mobile device 30 suitable for use with the flow meter 10. The mobile device 30 typically includes an NFC transmitter/receiver module 32, a mobile data transmitter/receiver module 34, a GPS module 36, a camera 38, an accelerometer/inclinometer/tilt sensor module 40, a compass/magnetometer module 42, a data storage module 44, a control module 46, a user interface/display module 48, and a microphone and speaker (not illustrated).

The NFC transmitter/receiver module 32 is operable to establish a short-range data communication link with the NFC transmitter/receiver module 20 of the flow meter 10, using NFC standards as discussed above. In particular, the NFC transmitter/receiver module 32 of the mobile device 30 is operable to interrogate the NFC transmitter/receiver module 20 of the flow meter 10, to cause it to send a data packet 54 containing at least an instrument identifier of the flow meter 10.

The GPS module 36 enables the geolocation of the mobile device 30 to be determined.

The camera 38 is operable to produce still images or video clips of the vicinity of the mobile device 30. These images or video clips are stored as data files. Audio clips may also be recorded.

The accelerometer/inclinometer/tilt sensor module 40 (which may also incorporate gyroscopic means, such as a gyro position sensor) is operable to sense the angle of inclination of the mobile device 30 and/or any vibration to which the device 30 is subjected.

The compass/magnetometer module 42 is operable to determine the compass bearing of the mobile device 30.

The data storage module 44 incorporates data storage means such as a flash or RAM memory, and is operable to store data received from the flow meter 10 via the NFC modules 20 and 32. The data storage module 44 is also operable to store data produced by the mobile device 30 itself, for example as produced by the GPS module 36, camera 38, accelerometer/inclinometer/tilt sensor 40, or compass/magnetometer 42.

The mobile data transmitter/receiver module 34 is operable to transmit data to, and receive data from, a data storage device 52 via a wireless data communication network 50. The data communication between the mobile data transmitter/receiver module 34 and the network 50 may use any suitable existing technology, such as GSM, GPRS, EDGE, 3G, HSDPA, HSPA+, LTE or 4G, or any other suitable technology that may be introduced in the future. The data transmitted may be previously-stored data obtained from the data storage module 44, or data obtained directly from the flow meter 10 via the NFC modules 20 and 32, or data produced directly by the mobile device 30 (for example as produced by the GPS module 36, camera 38, accelerometer/inclinometer/tilt sensor 40, or compass/magnetometer 42).

The data storage device 52 is preferably a remote server in communication with the network 50, thereby enabling the data stored thereon to be accessed by different engineers in different locations, their supervisors, and other relevant personnel.

Instead of, or in addition to, data storage device 52 that is accessed by the mobile device 50 via wireless network 50, the mobile device 30 may be arranged to communicate with other data storage devices, such as one that is directly connected to the mobile device 30 by a wired or wireless link.

Data received by the mobile device 30 from the data storage device 52 (or elsewhere) may be stored in the data storage module 44 and presented to the user via the user interface/display 48.

The control module 46 contains one or more microprocessors configured and programmed to control the operation of the above-described components of the mobile device 30. The control module 46 is also configured to control the user interface/display 48, via which a user is able to interact with the mobile device 30.

In a presently-preferred embodiment, dedicated control software (e.g. an application program (or "app")) is installed on the mobile device 30, stored within the data storage module 44 and run by the control module 46, to control its interaction with the flow meter 10.

Via the control software and the user interface/display 48, the user is also able to enter text or diagrams relating to the flow meter 10, such as engineering notes in respect of its installation, service or repair, or explanatory information regarding its purpose or configuration.

Short-Range Transmitted Data Packet

When interrogated by the mobile device 30, the flow meter 10 sends a short-range data packet 54 via NFC (or, in alternative embodiments, via RFID) to the mobile device. The data packet 54 includes at least an item of reference data associated with the flow meter 10. In a presently-preferred embodiment the item of reference data is an instrument identification code (or "identifier"), providing a unique identification of the flow meter 10. In other embodiments, the item of reference data may comprise one or more of a hyperlink, a position code or location information, for example.

In embodiments of the flow meter 10 which have an RFID module instead of an NFC module 20, the data packet 54 may contain the instrument identification code only. However, in the presently-preferred embodiments the flow meter 10 communicates with the mobile device 30 via NFC, enabling the data packet 54 to contain additional data such as the present instrument reading of the device, as measured by the principal sensor(s), and/or items of operation data as measured by the ancillary sensor(s) referred to above.

The following discussion will describe the installation and use of the flow meter 10 in conjunction with the mobile device 30, and how the use of the short-range communication between the flow meter 10 and the mobile device 30 can provide practical benefits for an installation or service engineer. It will be seen how the capabilities of the mobile device 30 can be used to complement or enhance the information provided by the flow meter 10. In particular, the mobile device 30 can obtain the identifier from the flow meter 10 via NFC (or RFID) and use this identifier to store or retrieve information related to the flow meter 10, such information being associated with the obtained identifier.

Installation of the Flow Meter

When the flow meter 10 is installed, the engineer can use his mobile device 30 to obtain the instrument identifier of the flow meter via NFC (or RFID), the instrument identifier being an item of reference data sent by the flow meter. Other items of data (or so-called "metadata") related to the flow meter 10 can then be obtained and stored in a data storage device, in association with the instrument identifier, under the control of the mobile device 30 and the control software running thereon. The stored data can be subsequently retrieved, simply and efficiently, through association with the instrument identifier.

The data storage device may be, for example, network-based data storage device 52, or data storage module 44 within the mobile device 30, or data storage module 18 within the measurement instrument 10. Of these, it is often preferable to use the network-based data storage device 52, to enable the data to be easily accessed by other engineers in the future, but if there is no operational data communication link between the mobile data transmitter/receiver 34 and the network-based data storage device 52 then the mobile device 30 may store the data in its internal storage module 44, or in another storage device in communication with the mobile device 30 (such as the flow meter's data storage module 18). The data may then be uploaded from the storage module 44/18 to the network-based data storage device 52 at a subsequent time, when an operational data communication link becomes available. Alternatively the data may be retained in storage module 44 or storage module 18.

To elaborate and exemplify, when installing the flow meter 10 the engineer may take one or more photographs or video clips of the flow meter 10 and the installation site using the camera 38 of the mobile device 30, and/or may record one or more audio clips if desired (e.g. a verbal narrative explaining what has been done). These are then stored as data files, in association with the instrument identifier and the date/time, in the data storage device (either data storage module 18, data storage module 44 or network-based storage device 52, as discussed above) for future reference—for example in the event that the flow meter 10 is subsequently tampered with, or to facilitate a future service visit or repair job, or as a record of the installation for quality control purposes, say, or for in-situ performance verification.

Alternatively, or in addition, the engineer may capture the geolocation of the flow meter 10 using the GPS module 36 of the mobile device 30, and/or the compass bearing of the flow meter 10 using the compass/magnetometer 42 of the mobile device 30, and/or the inclination of the flow meter 10 using the accelerometer/inclinometer/tilt sensor 40 of the mobile device—for example by placing the mobile device 30 alongside the flow meter 10. Such information is then stored in association with the instrument identifier in the storage device (e.g. 18, 44 or 52) as discussed above.

An initial instrument reading may also be obtained from the flow meter 10, using its principal sensor(s) and transmitted to the mobile device 30 via NFC, and then stored in association with the instrument identifier and the date/time in the storage device (e.g. 18, 44 or 52) for future analysis or reference Furthermore, initial operation data from the flow meter 10 (or the apparatus to which the flow meter 10 is connected) may also be captured. This operation data may be obtained from ancillary sensor(s) associated with the flow meter 10 and transmitted to the mobile device 30 via NFC, as described above. Alternatively, or in addition, operation data may be obtained using the sensors of the mobile device 30, for example recording an operational noise level using the mobile device's built-in microphone, or detecting vibration levels by placing the mobile device 30 against the flow meter 10 and collecting vibration data via the accelerometer 40 of the mobile device 30. Such data is then stored in association with the instrument identifier and the date/time in the storage device (e.g. 18, 44 or 52).

Finally, during the installation process, the engineer may enter text or diagrams relating to the flow meter into the mobile device 30, via the control software and the user interface/display 48. Alternatively, or in addition, he may select appropriate text from pre-prepared menus or lists. Examples of such text include engineering notes detailing aspects of the installation of the flow meter 10, comments that may be of use to subsequent service or repair personnel, or explanatory information regarding the purpose of the flow meter 10. The text and/or diagrams are then stored as data in the storage device (e.g. 18, 44 or 52), in association with the instrument identifier and the date/time.

Servicing or Repairing the Flow Meter

When the flow meter 10 is subsequently serviced or repaired, the engineer can use his mobile device 30 to obtain the identifier of the flow meter 10 via NFC (or RFID) from the measurement instrument 10. The mobile device 30 is then able to retrieve related items of data (or so-called metadata) from the data storage device, through reference to the instrument identifier with which the related items of data have been associated in the data storage device, and to output the retrieved data to the user (e.g. via the user interface/display 48).

As discussed above, the data storage device is preferably the network-based data storage device 52, but it may alternatively be the internal data storage module 44 of the mobile device 30, or the data storage module 18 of the measurement instrument 10, or another storage device in communication with the mobile device 30.

The retrieval of data from the storage device is performed under the control of the mobile device 30 and the software running thereon, using the instrument identifier obtained from the flow meter 10. For example, once the mobile device 30 has obtained the instrument identifier from the flow meter 10, the mobile device 30 may automatically interrogate the data storage device to determine what related data is available for retrieval, and may then present the available options to the engineer for selection via the user interface/display 48 of the mobile device 30.

For instance, the engineer may use the mobile device 30 to retrieve, from the data storage device, the photographs, audio or video clips taken when the flow meter 10 was first installed. He may then refer to these photographs or audio/video clips to aid the service or repair job, for example by seeing how the flow meter 10 was initially installed or configured.

He may also use his mobile device 30 to take one or more current photographs or audio/video clips of the flow meter 10 and its surroundings—for example once the service or repair job has been completed, in order to provide proof that the work has been carried out, or for quality control purposes, or for future reference (e.g. during a future service visit or repair job). These photographs and audio/video clips are then stored, in association with the instrument identifier and the date/time, in the data storage device (either data storage module 18, data storage module 44, or network-based storage device 52, as discussed above).

Alternatively, or in addition, he may use the mobile device 30 to retrieve from the storage device the stored geolocation, compass bearing or inclination of the flow meter 10. Such data may also be of assistance during the service or repair job—e.g. to check that the meter has not moved since it was first installed.

He may also use the mobile device 30 to retrieve stored instrument reading(s) from the storage device. Additionally, he may use the mobile device 30 to obtain via NFC a current instrument reading from the flow meter 10 (as obtained by the principal sensor(s) of the flow meter). If he wishes, he may then compare, using the mobile device 30, the current instrument reading with the retrieved instrument reading(s), for example as part of an analysis or review of the flow meter's operation. The mobile device 30 is further operable to store the current instrument reading, and the current date/time, in the storage device, the current instrument reading and date/time being associated with the instrument identifier in the storage device.

In a similar manner, the engineer may use the mobile device 30 to retrieve stored operation data (e.g. relating to noise levels, vibration levels, etc.) from the storage device. Additionally, he may use the mobile device 30 to obtain current operation data relating to the flow meter 10, in a similar manner as at the time of installation, as described above. If he wishes, he may then compare, using the mobile device 30, the current operation data with the retrieved operation data, for example as part of an analysis or review of the flow meter's operation. The mobile device 30 is further operable to store the current operation data and the current date/time in the storage device for subsequent analysis or reference, the current operation data and date/time being associated with the instrument identifier in the storage device.

Finally, during the service or repair process, the engineer may also use the mobile device 30 to retrieve stored text, diagrams, audio or video relating to the flow meter 10 (e.g. engineering notes or explanatory information regarding the installation of the meter). He may also use the mobile device 30 to enter new text or diagrams, for example to provide details of the present service or repair job. Such text or diagrams are then stored as data in the storage device, in association with the instrument identifier and the date/time, for future reference (e.g. to be of help in a subsequent repair job).

Remote Data Retrieval

Although in the above examples the data retrieval operations are performed by the engineer using the mobile device 30 in-situ, for example whilst servicing or repairing the flow meter 10, the data retrieval operations may alternatively be performed by a colleague (such as the engineer's supervisor) in another location (such as a service centre), or by the manufacturer of the flow meter, or by a customer etc., via a communication link to the data storage device 52. This enables the colleague/supervisor or manufacturer/customer to check that a service or repair job has been carried out satisfactorily, and to have access to the data collected. In one embodiment, the photographs, audio/video clips and other collected data may be made available through hyperlinks to the storage device.

Additionally, remote data retrieval may be used to enable the manufacturer to provide an end user with a diagnostic and configuration assistance service. For example, a meter 10 may be installed, and the user subsequently uses his mobile device 30 at the meter 10 to extract configuration information and diagnostic data from the meter 10 and to store this information/data on a remote server 52. The manufacturer can then access this information/data from the server 52 and analyse it. Having analysed it, configuration changes can be made remotely to the installed device without a visit from a service engineer, for example as described below under "flow meter reprogramming".

Access to Support Materials

Support materials (in digital form) relating to the flow meter 10, or to its installation or service procedures, may be stored on the data storage device 52 or elsewhere that is accessible to the mobile device 30 via the network 50. The support materials may include documentation such as instruction manuals, datasheets, diagrams, service notes, explanatory text, and so on. Likewise, video and/or audio support materials (e.g. demonstrating or explaining the installation and service procedures) may also be stored. The stored support materials may also include flow meter serial number related issues, such as details of product recall.

The engineer is able to download the support materials to his mobile device 30 via the network 50 and the mobile data transmitter/receiver 34. By virtue of an app or other software being run, the mobile device 30 can be informed of the meter type and can thereby automatically filter relevant online support materials/documentation available and applicable to that meter type. These techniques are well-known to those skilled in the art and need not be discussed in detail.

Advantageously, however, in accordance with the present work the engineer may use the NFC (or RFID) functionality of his mobile device 30 to obtain the instrument identifier of a particular flow meter 10, in the manner described above. Upon receiving the instrument identifier from the flow meter 10, the mobile device 30 is then able to obtain from the data storage device 52 (via the network 50) the details of the support materials relating to the flow meter 10 that are available for download, such support materials being associated with the instrument identifier in the data storage device 52. For example, the user may download support documentation for the flow meter, or may be notified of a product recall associated with the serial number of the flow meter.

In more detail, in one variant, the support materials relating to the flow meter 10 are directly associated with the corresponding instrument identifier in the data storage device 52. In another variant, in the data storage device 52, the support materials are associated with a product code relating to the make or model of the flow meter 10, and the flow meter's instrument identifier is also associated with that product code. Thus, once the engineer's mobile device 30 has obtained the instrument identifier from the flow meter 10 via NFC (or RFID), he is able to obtain the related support materials using the instrument identifier, via the associated product code if necessary.

Preliminary Site Surveying

As an option, the mobile device 30 may be configured to act as a site survey tool, for use prior to, or after, installation of a flow meter 10. Commercially, this may be offered on a "pay-per-use" basis.

When operating as a site survey tool, the accelerometer/inclinometer/tilt sensor module 40 of the mobile device 30 is used to measure and analyse any vibration of a candidate location (e.g. pipe) in which it is proposed that the flow meter 10 be attached (or to which it has already been attached). For example, the mobile device 30 is laid on the candidate pipe and the vibration data is collected. Having obtained the vibration data from the site, the mobile device 30 is able to assess if the proposed location is suitable (e.g. if the measured vibration levels are equal to or below a certain threshold for the meter in question), or if the location might be problematic for the meter (e.g. if the measured vibration levels are above the threshold). Such information is important for measurement instruments that are vibration sensitive, such as certain types of liquid or mass flow meters.

With some meters, vibration energy can be scavenged from the installation site and used to power the meter. For such meters, the mobile device 30 operating as a site survey tool can also be used to check if there is sufficient vibration to enable the requisite amount of energy to be scavenged for the meter in question, but not so much vibration so as to cause damage to the meter over time.

In a preferred embodiment, the mobile device 30 is able to obtain the threshold value(s) for the meter in question by first obtaining the reference data (e.g. instrument identifier) from the meter 10 by NFC (or RFID), in the manner as described above, and then downloading the vibration threshold value(s) that is/are applicable to that particular make or model of meter from the network-based data storage device 52. The mobile device 30 can then automatically compare the measured vibration levels with the threshold(s) and indicate whether the proposed installation location is suitable (from the point of view of vibration levels). Alternatively, in other embodiments, the comparison between the measured vibration levels with the threshold(s) can be performed remotely, e.g. on the data storage device 52.

With respect to the retrieval of the vibration threshold value(s) from the data storage device 52 based on instrument identifier, in one variant the vibration threshold value(s) relating to the flow meter 10 are directly associated with the corresponding instrument identifier in the data storage device 52. In another variant, in the data storage device 52, the threshold value(s) are associated with a product code relating to the make or model of the flow meter 10, and the flow meter's instrument identifier is also associated with that product code.

Remote Recalibration/In-Situ Performance Verification Service

As an option, the mobile device 30 may be used to provide a recalibration or in-situ performance verification service for the flow meter 10. In-situ performance verification refers to the ability to verify the operational performance of an installed flow meter in its place of use. Commercially, this service may be offered on a "pay-per-use" basis.

This option makes use of quantitative data (for example flow-rate sensor coil inductance values) collected from the flow meter 10 as described above, transmitted to the mobile device 30 by NFC together with the instrument identifier of the meter 10. The quantitative data may include instrument reading data collected from the principal sensor(s), and/or operation data collected from the ancillary sensor(s). The mobile device 30 transmits the quantitative data to a remote data storage device (e.g. device 52) via the mobile data transmitter/receiver 34 and network 50. The quantitative data is then analysed, for example in a service centre, to determine whether recalibration or reconfiguration of the flow meter 10 is necessary. As part of this analysis, the instrument identifier may be used to identify the meter. Instead of the analysis taking place remotely, in an alternative embodiment the analysis may be carried out by software (e.g. a downloaded app) running locally on the mobile device 30, potentially with authentication or payment functions being handled via a remote server (e.g. device 52).

If recalibration or reconfiguration of the flow meter 10 is deemed necessary, the service centre sends recalibration or reconfiguration data back to the mobile device 30, via network 50 and the mobile data transmitter/receiver 34. The mobile device 30 is then used to send, via NFC, the recalibration or reconfiguration data to the flow meter 10.

In the recalibration operation, the flow meter 10 receives the recalibration or reconfiguration data via the NFC transmitter/receiver 20, and it is passed to the control module 14 to reprogram the operation of the flow meter. In particular, the recalibration or reconfiguration data may be used by the control module 14 to alter the manner in which the control module 14 converts the digitised measurement signals received from the sensor input module 16 into actual measurement values.

In an alternative embodiment, the analysis of the quantitative data and the issuance of the recalibration or reconfiguration data may be done directly by the mobile device 30, rather than involving a remote location.

With in-situ performance verification, the mobile device 30 can upload the results and certificates of the verification to a remote server for future reference.

Flow Meter Reprogramming

Other reprogramming or reconfiguration data (e.g. firmware updates) for the flow meter 10 may be downloaded via NFC from the mobile device 30 to the flow meter 10. Such data is received by the flow meter 10 via its NFC transmitter/receiver 20 and passed to the control module 14, to reprogram its operation.

The reprogramming or reconfiguration data may be supplied by a service centre (e.g. from data storage device 52) to the mobile device 30 via the network 50 and the mobile data transmitter/receiver 34, either at the same time as the mobile device 30 is in near field communication with the flow meter 10, or beforehand. The user may be required to pay the service centre for the reprogramming data, or it may be supplied free of charge.

In a preferred embodiment the reprogramming or reconfiguration data that is sent by the service centre to the mobile device 30 is specifically suited to the make and model of flow meter 10. The correct type/version of the reprogramming or reconfiguration data is selected by the service centre based on the flow meter's instrument identifier, as sent by the flow meter 10 by NFC to the mobile device 30, and from the mobile device 30 to the service centre via the network 50.

In an alternative embodiment, the reprogramming or reconfiguration data may be provided directly from the mobile device 30, rather than being downloaded from a remote location.

Optional Feature Activation

As supplied, the flow meter 10 may be equipped with one or more "dormant" features that are not initially available for use, but which can be subsequently activated and made usable on receipt of activation instruction code from the mobile device 30 to the flow meter 10 via NFC.

As above, the user may first be required to pay the service centre of the flow meter 10. The activation instruction code is then supplied by the service centre to the mobile device 30 via the network 50 and the mobile data transmitter/receiver 34. Using near field communication between with the mobile device 30 and the flow meter 10, the activation instruction code is then transmitted from the mobile device 30 to the flow meter 10, where it is received by the NFC transmitter/receiver 20 and passed to the control module 14, to activate the dormant functionality.

Modifications and Alternative Embodiments

Detailed embodiments have been described above. As those skilled in the art will appreciate, a number of additional modifications and alternatives can be made to the above embodiments whilst still benefiting from the inventions embodied therein.

For example, in the embodiments described above the measurement instrument 10 is an industrial flow meter. However, in alternative embodiments it may be another type of measurement instrument, such as a pH meter, pressure sensor, level sensor, temperature sensor, utility consumption meter, drive/actuator monitoring instrument, or robotic instrument.

In the above discussion, the communication protocol between the mobile device 30 and the measurement instrument 10 is primarily described as being near field communication (NFC). However, in alternative embodiments RFID can be used instead of NFC—particularly in situations in which only an instrument identifier needs to be obtained from the measurement instrument. Other forms of data communication via inductive coupling are also possible, now or in the future. Accordingly, the terms "near field communication" or "NFC" as used herein should be interpreted so as to encompass RFID and other forms of data communication via inductive coupling, unless it is apparent that they would be inadequate for the purpose described.

In the above embodiments, a number of modules have been described, representing different functional aspects of the flow meter 10 or the mobile device 30. As those skilled in the art will appreciate, in practice the modules need not be separate distinguishable units, and one or more may be integrated with one another in hardware, or equivalent functionality provided through software.

In the above embodiments, the items of data (or so-called "metadata") associated with a specific flow meter are primarily referenced to that flow meter by virtue of an instrument identifier transmitted within the data packet 54 sent from the flow meter 10 to the mobile device 30, the instrument identifier serving as reference data. However, the reference data need not be an instrument identifier, and in other embodiments other items of reference data, such as a hyperlink, location information or a position code, may instead be transmitted within the data packet 54 and used for storing and/or retrieving the metadata.

As a particular example, a flow meter may transmit a hyperlink in the data packet 54, the hyperlink providing means for reaching a data storage (and retrieval) location for the metadata relating to that specific flow meter. The data storage location may be in the measuring device's memory 18, or the mobile device's storage module 44, or in a remote location (e.g. in the network based storage device 52).

Thus, rather than referencing the metadata from a measurement instrument to a corresponding instrument identifier, direct reference to the metadata can be made on the server-based data storage device 52, or the data storage module 44 of the mobile device 30, via a stored path or hyperlink to this data. As an example the geolocation of a measurement instrument, captured from a mobile device's GPS locator 36, could be stored not only as a GPS location, but also embedded in a hyperlink to an online mapping application, such as Google Maps, for example. The user can then launch this hyperlink directly using the mobile device's internet connectivity, to display in a satellite aerial view the exact location of say the flow meter sensor. It should be noted that flow meter sensors are often buried underground, often under roads, so it may not be obvious to a dig crew where the actual sensor is, and thus a detailed satellite view can greatly facilitate finding a buried sensor.

Alternatively the user may store their captured metadata, such as photographs, audio/video clips, text or diagrams, on an Internet "cloud"-based server of their choice, or on the user's private server, and then record directly a hyperlink to this data in the measuring device's memory 18, or the mobile device's storage module 44, or on the network based storage device 52.

Alternatively the user may store their captured metadata directly in the measuring instrument 10, within its data store 18.

Various other modifications and alternatives will be apparent to those skilled in the art and will not be described in further detail here.

The invention claimed is:

1. A method of processing data related to an installation process, service process or performance of a measurement instrument, the method being performed by a mobile device, the mobile device comprising a transmitter, a receiver and a processor, the method comprising:
   the transmitter interrogating the measurement instrument using near field communication;
   the receiver receiving, in response to the interrogating, reference data from the measurement instrument;
   the mobile device capturing data related to the installation process, service process or performance of the measurement instrument; wherein capturing the data includes the receiver receiving, in response to the interrogating, data from the measurement instrument in addition to the reference data;
   the mobile device storing the captured data using or in association with the reference data in a data storage device for subsequent retrieval;
   the processor analysing the data received from the measurement instrument, to determine whether recalibration or reconfiguration of the measurement instrument is necessary; and
   in dependence on recalibration or reconfiguration being determined as necessary, the processor producing recalibration or reconfiguration data and the transmitter sending the recalibration or reconfiguration data to the measurement instrument via near field communication, to recalibrate or reconfigure the measurement instrument.

2. The method according to claim 1, wherein capturing the data comprises one or more of the following:
   the mobile device taking a photograph or a video clip, or recording audio;
   the mobile device capturing data relating to a physical position of the measurement instrument or of a port of the measurement instrument;
   the mobile device capturing a geolocation of the measurement instrument or the port using a location determiner of the mobile device;
   the mobile device capturing a compass bearing of the measurement instrument or the port, or inclination of the measurement instrument or the port, using one or more sensors of the mobile device;
   the mobile device receiving text or diagrams inputted or selected using the mobile device.

3. The method according to claim 1, wherein
   the data received from the measurement instrument includes data relating to operational characteristics of the measurement instrument as detected by one or more sensors associated with the measurement instrument;
   optionally wherein the sensors associated with the measurement instrument include one or more of: a vibration sensor, a tamper detector, a movement detector, an accelerometer, an inclinometer, a magnetometer, or a positioning receiver;
   and/or optionally wherein the data received from the measurement instrument includes a current or past instrument reading.

4. The method according to claim 1, wherein the reference data comprises one or more of an instrument identifier, a hyperlink, a position code or location information.

5. The method according to claim 1, wherein storing the captured data using or in association with the reference data comprises the mobile device storing the data in a data storage module of the mobile device.

6. The method according to claim 1, wherein storing the captured data using or in association with the reference data comprises the mobile device storing the data in a data storage device separate from the mobile device and in communication with the mobile device via a network.

7. A method according to claim 1, wherein storing the captured data using or in association with the reference data comprises the mobile device storing the data in a data storage module of the measurement instrument.

8. The method according to claim 1, further comprising:
   the processor analyzing the data received from the measurement instrument, to perform in-situ verification of the performance of the measurement instrument.

9. The method according to claim 1, further comprising:
   the mobile device sending the data received from the measurement instrument to another location for analysis, to perform in-situ verification of the performance of the measurement instrument.

10. The method according to claim 1, wherein the measurement instrument is selected from a group comprising:
    a flow meter, a pH meter, a pressure sensor, a level sensor, a temperature sensor, a utility consumption meter, a drive/actuator monitoring instrument, a robotic instrument.

11. A mobile device programmed and configured to execute a method of processing data related to an installation process, service process or performance of a measurement instrument, the mobile device comprising a transmitter and a receiver and a processor; the method being performed by the mobile device and comprising:

the transmitter interrogating the measurement instrument using near field communication;

the receiver receiving, in response to the interrogation, reference data from the measurement instrument;

the mobile device capturing data related to the installation, service or performance of the measurement instrument; wherein capturing the data includes the receiver receiving, in response to the interrogation, data from the measurement instrument in addition to the reference data;

the mobile device storing the captured data using or in association with the reference data in a data storage device, for subsequent retrieval;

the processor analysing the data received from the measurement instrument, to determine whether recalibration or reconfiguration of the measurement instrument is necessary; and in dependence on recalibration or reconfiguration being determined as necessary, the processor producing recalibration or reconfiguration data and the transmitter sending the recalibration or reconfiguration data to the measurement instrument via near field communication, to recalibrate or reconfigure the measurement instrument.

12. The mobile device according to claim 11, comprising a smart phone, tablet, portable computer, or personal digital assistant.

13. A method of processing data related to an installation process, service process or performance of a measurement instrument, the method being performed by a mobile device, the mobile device comprising a transmitter and a receiver, the method comprising:

the transmitter interrogating the measurement instrument using near field communication;

the receiver receiving, in response to the interrogation, reference data from the measurement instrument;

the mobile device capturing data related to the installation process, service process or performance of the measurement instrument; wherein capturing the data includes the receiver receiving, in response to the interrogation, data from the measurement instrument in addition to the reference data;

the mobile device storing the captured data using or in association with the reference data in a data storage device, for subsequent retrieval;

the mobile device sending the data received from the measurement instrument to another location for analysis, to determine whether recalibration or reconfiguration of the measurement instrument is necessary; and in dependence on recalibration or reconfiguration being determined as necessary, the mobile device receiving recalibration or reconfiguration data from the other location and then the transmitter sending the recalibration or reconfiguration data to the measurement instrument via near field communication, to recalibrate or reconfigure the measurement instrument.

14. The method according to claim 13, wherein capturing the data comprises one or more of the following:

the mobile device taking a photograph or a video clip, or recording audio;

the mobile device capturing data relating to a physical position of the measurement instrument or of a port of the measurement instrument;

the mobile device capturing a geolocation of the measurement instrument or the port using a location determiner of the mobile device;

the mobile device capturing a compass bearing of the measurement instrument or the port, or inclination of the measurement instrument or the port, using one or more sensors of the mobile device;

the mobile device receiving text or diagrams inputted or selected using the mobile device.

15. The method according to claim 13, wherein the data received from the measurement instrument includes data relating to operational characteristics of the measurement instrument as detected by one or more sensors associated with the measurement instrument;

optionally wherein the sensors associated with the measurement instrument include one or more of: a vibration sensor, a tamper detector, a movement detector, an accelerometer, an inclinometer, a magnetometer, or a positioning receiver;

and/or optionally wherein the data received from the measurement instrument includes a current or past instrument reading.

16. The method according to claim 13, wherein the reference data comprises one or more of an instrument identifier, a hyperlink, a position code or location information.

17. The method according to claim 13, wherein storing the captured data using or in association with the reference data comprises the mobile device storing the data in a data storage module of the mobile device.

18. The method according to claim 13, wherein storing the captured data using or in association with the reference data comprises the mobile device storing the data in a data storage device separate from the mobile device and in communication with the mobile device via a network.

19. The method according to claim 13, wherein storing the captured data using or in association with the reference data comprises the mobile device storing the data in a data storage module of the measurement instrument.

20. The method according to claim 13, further comprising:

a processor of the mobile device analyzing the data received from the measurement instrument, to perform in-situ verification of the performance of the measurement instrument.

21. The method according to claim 13, further comprising:

the mobile device sending the data received from the measurement instrument to another location for analysis, to perform in-situ verification of the performance of the measurement instrument.

22. The method according to claim 13, wherein the measurement instrument is selected from a group comprising:

a flow meter, a pH meter, a pressure sensor, a level sensor, a temperature sensor, a utility consumption meter, a drive/actuator monitoring instrument, a robotic instrument.

23. A mobile device programmed and configured to execute a method of processing data related to an installation process, service process or performance of a measurement instrument, the mobile device comprising a transmitter and a receiver, the method being performed by the mobile device and comprising:

the transmitter interrogating the measurement instrument using near field communication;

the receiver receiving, in response to the interrogation, reference data from the measurement instrument;

the mobile device capturing data related to the installation, service or performance of the measurement instrument; wherein capturing the data includes the receiver receiving, in response to the interrogation, data from the measurement instrument in addition to the reference data;

the mobile device storing the captured data using or in association with the reference data in a data storage device, for subsequent retrieval;

the mobile device sending the data received from the measurement instrument to another location for analysis, to determine whether recalibration or reconfiguration of the measurement instrument is necessary; and in dependence on recalibration or reconfiguration being determined as necessary, the mobile device receiving recalibration or reconfiguration data from the other location and then the transmitter sending the recalibration or reconfiguration data to the measurement instrument via near field communication, to recalibrate or reconfigure the measurement instrument.

24. The mobile device according to claim 23, comprising a smart phone, tablet, portable computer, or personal digital assistant.

* * * * *